(12) United States Patent
Smith et al.

(10) Patent No.: US 12,699,227 B2
(45) Date of Patent: Aug. 4, 2026

(54) OPTICAL ASSEMBLY WITH AN OPTICAL ELEMENT TO SUPPRESS A PARASITIC ETALON RESPONSE

(71) Applicant: LUMENTUM TECHNOLOGY UK LIMITED, Northamptonshire (GB)

(72) Inventors: Colin Smith, Paignton (GB); Stuart Conley, Newton Abbot (GB); Samuel Justin Jones, Paignton (GB)

(73) Assignee: Lumentum Technology UK Limited, Northamptonshire (GB)

( * ) Notice: Subject to any disclaimer, the term of this patent is extended or adjusted under 35 U.S.C. 154(b) by 185 days.

(21) Appl. No.: 18/135,022

(22) Filed: Apr. 14, 2023

(65) Prior Publication Data

US 2024/0280756 A1 Aug. 22, 2024

Related U.S. Application Data

(60) Provisional application No. 63/446,233, filed on Feb. 16, 2023.

(51) Int. Cl.
| | |
|---|---|
| *G02B 6/293* | (2006.01) |
| *G01J 3/26* | (2006.01) |
| *G01J 3/42* | (2006.01) |
| *G02B 27/00* | (2006.01) |

(52) U.S. Cl.
CPC ............ *G02B 6/29359* (2013.01); *G01J 3/26* (2013.01); *G01J 3/42* (2013.01); *G02B 27/00* (2013.01); *G02B 27/0018* (2013.01); *G02B 27/0025* (2013.01); *G02B 27/0037* (2013.01)

(58) Field of Classification Search
CPC ....... G02B 6/29359; G02B 5/284; G01J 3/26; G01J 3/42; G01J 2009/0257; G01J 2009/0219
See application file for complete search history.

(56) References Cited

U.S. PATENT DOCUMENTS

| | | | | |
|---|---|---|---|---|
| 4,859,060 A * | 8/1989 | Katagiri | ................. | G01D 5/266 |
| | | | | 356/519 |
| 5,202,939 A * | 4/1993 | Belleville | .......... | G02B 6/29359 |
| | | | | 250/227.27 |
| 2022/0276422 A1 * | 9/2022 | Houck | ............... | G02B 27/4244 |

* cited by examiner

*Primary Examiner* — Michelle M Iacoletti
*Assistant Examiner* — Mohamed Doumbia
(74) *Attorney, Agent, or Firm* — Harrity & Harrity, LLP

(57) ABSTRACT

In some implementations, an optical assembly includes a first etalon, a second etalon, and an optical element disposed between the first etalon and the second etalon. The first etalon is configured to transmit a collimated light beam from an input surface of the first etalon to an output surface of the first etalon, and to allow the collimated light beam to propagate from an output surface of the first etalon to the optical element. The optical element is configured to receive the collimated light beam, to change the collimated light beam to a de-collimated light beam, and to allow the de-collimated light beam to propagate from the optical element to an input surface of the second etalon. The second etalon is configured to transmit the de-collimated light beam from the input surface of the second etalon to an output surface of the second etalon.

20 Claims, 5 Drawing Sheets

100 ➝

OPTICAL ASSEMBLY WITH AN OPTICAL ELEMENT TO SUPPRESS A PARASITIC ETALON RESPONSE

CROSS-REFERENCE TO RELATED APPLICATION

This patent application claims priority to U.S. Provisional Patent Application No. 63/446,233, filed on Feb. 16, 2023, and entitled "LOW-NOISE OPTICAL FREQUENCY MONITOR." The disclosure of the prior application is considered part of and is incorporated by reference into this patent application.

TECHNICAL FIELD

The present disclosure relates generally to an optical assembly and to an optical assembly with at least one etalon and an optical element to de-collimate a collimated light beam.

BACKGROUND

An optical frequency monitor may measure a frequency (or a wavelength) of an optical beam (e.g., a light beam). The optical frequency monitor may thereby provide measurement information to enable control of a laser (e.g., a semiconductor laser) that generated the optical beam. An optical frequency monitor is often used in association with an optical transmission system (e.g., that utilizes one or more lasers), to ensure an accurate and stable optical frequency within the optical transmission system.

SUMMARY

In some implementations, an optical assembly includes a first etalon; a second etalon; and an optical element disposed between the first etalon and the second etalon, wherein: the first etalon is configured to transmit a collimated light beam from an input surface of the first etalon to an output surface of the first etalon, and to allow the collimated light beam to propagate from the output surface of the first etalon to the optical element, the optical element is configured to receive the collimated light beam, to change the collimated light beam to a de-collimated light beam, and to allow the de-collimated light beam to propagate from the optical element to an input surface of the second etalon, and the second etalon is configured to transmit the de-collimated light beam from the input surface of the second etalon to an output surface of the second etalon.

In some implementations, an optical assembly includes a first etalon; a second etalon; and an optical element disposed between the first etalon and the second etalon, wherein: the first etalon is configured to allow a collimated light beam to propagate from an output surface of the first etalon to the optical element, and the optical element is configured to receive the collimated light beam, to change the collimated light beam to a de-collimated light beam, and to allow the de-collimated light beam to propagate from the optical element to an input surface of the second etalon.

In some implementations, an optical assembly includes a first etalon; a monitor photodiode; and an optical element, wherein: the first etalon is configured to provide a collimated light beam to the optical element, and the optical element is configured to change the collimated light beam to a de-collimated light beam, and to provide the de-collimated light beam to the monitor photodiode.

DETAILED DESCRIPTION

Figure 1A:
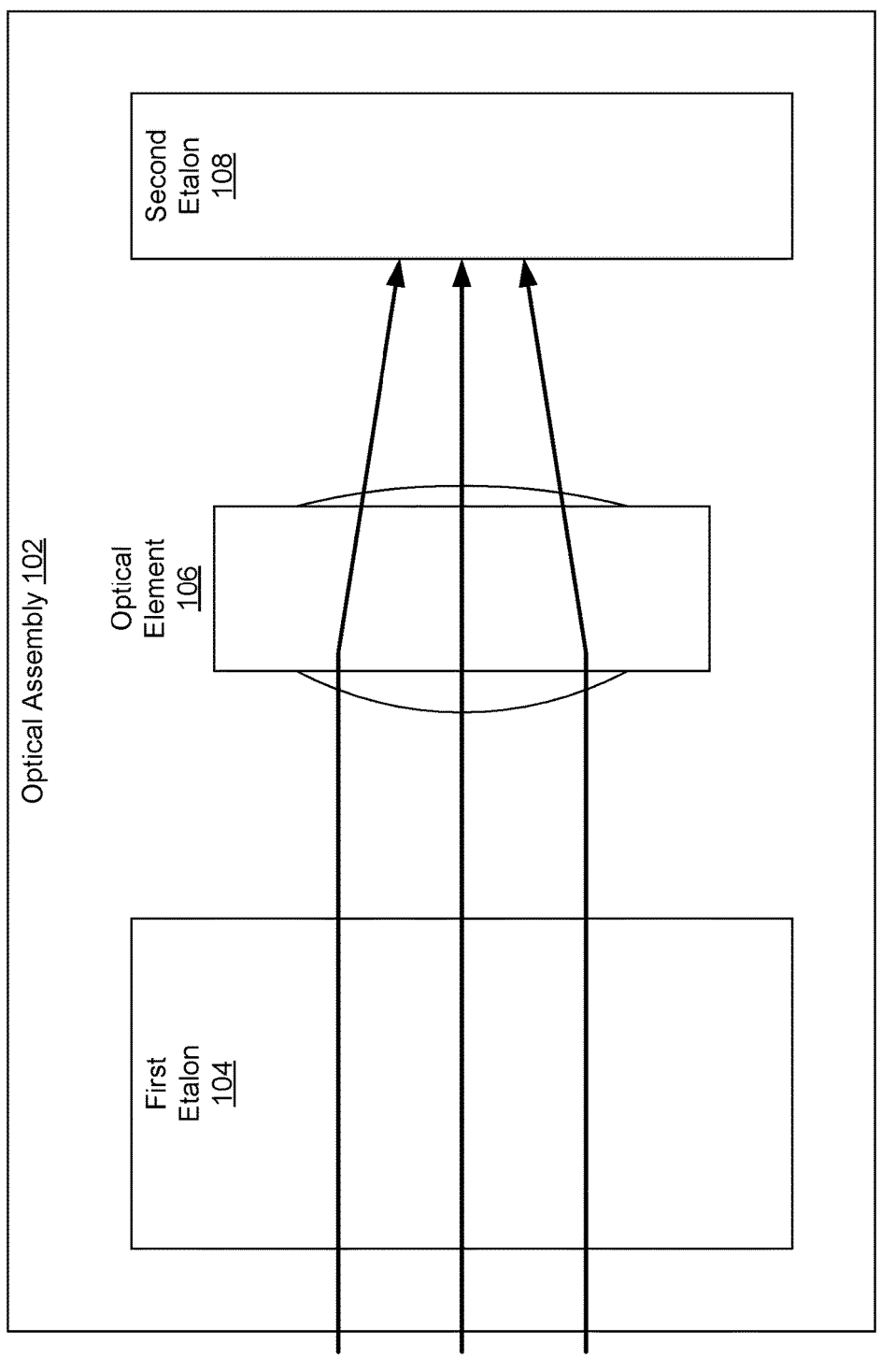
FIGS. 1A-1D are diagrams of an example implementation described herein.

The following detailed description of example implementations refers to the accompanying drawings. The same reference numbers in different drawings may identify the same or similar elements.

In many cases, an optical frequency monitor includes an optical resonator, such as an etalon or other interferometer. The optical resonator typically comprises a stable material, and has precise physical dimensions. The optical resonator therefore is configured as an optical reference (e.g., by which a frequency of an optical beam is determined). Typically, an optical beam is transmitted through the optical resonator, and a detector (e.g., a photodiode (PD)) of the optical frequency monitor measures a series of resonant peaks, which are related to the frequency (or wavelength) of the optical beam. To determine the frequency (or wavelength) of the optical beam (e.g., over a 5 terahertz (THz) range, centered at 192 THz), such as to an accuracy less than or equal to 1 gigahertz (GHz), a measurement requires an accuracy of about 1 in 200,000. Typically, the optical resonator facilitates 100 peaks spaced over a measurement range of 5 THz, so the optical frequency therefore needs to be measured with an accuracy of less than or equal to 1% over an identified peak, and the response from the optical resonator is required to be immune to any other optical resonances, reflections, or other beam imperfections within the optical frequency monitor.

However, measurement errors occur, which are due to, at least in part, variation in response of the detector (e.g., the PD). The detector often includes a semiconductor slab with multiple layers formed to absorb light and generate carriers, which are measured as a photocurrent. However, input and output surfaces (e.g., front and back surfaces) of the detector form optically reflecting surfaces. The detector therefore forms an etalon that has its own optical resonant frequency and that has resonances that couple back to the optical resonator.

Consequently, it can be difficult to adequately suppress internal optical frequency reflections within the detector and from the detector back to the optical resonator, which therefore create a ripple amplitude that affects an intensity of an optical signal's frequency that is being monitored. In some cases, an anti-reflection coating may be disposed on the input and/or output surfaces (e.g., the front and back surfaces) of the detector, but a net reflectivity is still sufficiently high to produce a ripple amplitude significantly greater than 1%. This makes frequency measurements to an accuracy less than or equal to 1 GHz difficult.

Some implementations described herein include an optical assembly, which may be included in an optical system or optical device, such as an optical frequency monitor. The optical assembly includes a first etalon, a second etalon (e.g., as part of a detector, such as a monitor PD, of the optical frequency monitor), and an optical element. The optical element may be a singular element (e.g., a lens) disposed between the first etalon and the second etalon, may be disposed on at least one of the first etalon or the second etalon, or may be integrated into a single component with at least one of the first etalon or the second etalon. The optical element may include one or more other optical components, such as diffractive gratings.

The optical element is configured to de-collimate a collimated light beam that propagates through the first etalon. In some implementations, the optical element is configured to change the collimated light beam to a de-collimated light beam and to provide the de-collimated light beam to the second etalon. Accordingly, by creating the de-collimated light beam, the optical element "distributes" the optical phase of the collimated light beam, which allows for any reflections (e.g., of the de-collimated light beam) within the second etalon, and from the second etalon to the first etalon, to be minimized or eliminated. This, accordingly, eliminates, or reduces, generation of parasitic etalon cavities within the second etalon and between the second etalon and the first etalon.

In this way, the optical assembly described herein has the effect of eliminating, or minimizing, a resonance response (e.g., a parasitic etalon response) in the second etalon of the optical assembly. When the optical assembly is included in an optical frequency monitor (and the second etalon is part of a detector, such as a monitor PD, of the optical frequency monitor), this reduces errors and inaccuracies in frequency measurements (e.g., of the collimated light beam that is changed to the de-collimated light beam) by the optical frequency monitor that would otherwise result from a resonance response in the second etalon. For example, the optical assembly may suppress a ripple amplitude to be less than or equal to 1% (e.g., of an intensity of an optical frequency measurement). This makes frequency measurements to a precision greater than or equal to 1 GHz possible. Therefore, the optical frequency monitor is able to provide more accurate optical frequency monitoring than an optical frequency monitor that does not include the optical assembly described herein.

FIGS. 1A-1D are diagrams of an example implementation 100 described herein. As shown in FIGS. 1A-1D, example implementation 100 comprises an optical assembly 102, which includes a first etalon 104, an optical element 106, and a second etalon 108.

The optical assembly 102 may be included in an optical system or optical device, such as an optical frequency monitor. Accordingly, the optical assembly 102 may also be referred to as an optical sub-assembly, an optical sub-system, or another term when referenced as part of an optical system or an optical device. While some implementations described herein are directed to the optical assembly 102 being included in optical frequency monitors, any other optical system or optical device, such as an optical power monitor, may include the optical assembly 102. Further, the optical assembly 102 may be used in place of any other optical assembly that includes two (or more) etalons, such as where unwanted reflection and/or coherent field interference effects (e.g., within the optical assembly) are to be controlled (e.g., minimized or eliminated).

Additionally, while some implementations described herein are directed to the optical assembly 102 including two etalons (e.g., the first etalon 104 and the second etalon 108), the optical assembly 102 may include any number of etalons (e.g., two or more etalons). Further, while some implementations described herein are directed to the optical assembly 102 including a single optical element (e.g., the optical element 106), the optical assembly 102 may include any number of optical elements (e.g., one or more optical elements). For example, an optical element may be associated with each pair of etalons, as further described herein.

The first etalon 104 may be an etalon, such as a Fabry-Perot interferometer. Accordingly, the first etalon 104 may include parallel reflection surfaces that are separated by a precise distance (e.g., to create an optical cavity). For example, as shown in FIGS. 1A-1D, the first etalon 104 may include an input surface (e.g., a left surface) for receiving a light beam (e.g., a collimated light beam) and an output surface (e.g., a right surface) for outputting the light beam (e.g., after the light beam has propagated within the first etalon 104 from the input surface to the output surface). Accordingly, the first etalon 104 may be configured to receive a light beam at the input surface of the first etalon 104, to transmit the light beam from the input surface of the first etalon 104 to the output surface of the first etalon 104, and/or to allow the light beam to propagate from the output surface of the first etalon 104 (e.g., to another component, such as the optical element 106). The first etalon 104 may comprise, for example, a material that includes at least silica, quartz, and/or glass, among other examples.

The optical element 106 may include at least one of a lens, a reflective optical component, a refractive optical component, a diffractive optical component, or another optical component (e.g., that is configured to distribute an optical phase of a collimated light beam, as further described herein). For example, as shown in FIGS. 1A-1D, the optical element 106 may include a lens, such as a converging lens (e.g., a focusing lens). As another example, the optical element 106 may include a diffractive grating. In some implementations, the optical element 106 may be configured to receive a light beam (e.g., from the first etalon 104), to change the light beam (e.g., to change a collimated light beam to a de-collimated light beam), and/or to allow the light beam (e.g., after changing the light beam) to propagate from the optical element 106 (e.g., to another component, such as the second etalon 108). In some implementations, to change the light beam, the optical element 106 may produce a phase delay in at least some sub-beams of the light beam and/or may alter a propagation direction of the sub-beams (e.g., cause the sub-beams to diffract, refract, or otherwise bend). The optical element 106 may comprise, for example, a material that includes at least silica, quartz, silicon, a polymer, and/or glass, among other examples.

The second etalon 108 may be an etalon, such as a Fabry-Perot interferometer. Accordingly, the second etalon 108 may include parallel reflection surfaces that are separated by a distance (e.g., to create an optical cavity). For example, as shown in FIGS. 1A-1D, the second etalon 108 may include an input surface (e.g., a left surface shown in FIGS. 1A-1C, or a top surface shown in FIG. 1D) for receiving a light beam (e.g., a de-collimated light beam) and an output surface (e.g., a right surface shown in FIGS. 1A-1C, or a bottom surface shown in FIG. 1D) for outputting the light beam (e.g., after the light beam has propagated within the second etalon 108 from the input surface to the output surface). Accordingly, the second etalon 108 may be configured to receive a light beam at the input surface of the second etalon 108, to transmit the light beam from the input surface of the second etalon 108 to the output surface of the second etalon 108, and/or to allow the light beam to propagate from the output surface of the second etalon 108 (e.g., to another component, such as of an optical monitor 202, as described herein). The second etalon 108 may comprise, for example, a material that includes at least silica, quartz, silicon, a polymer, a semiconductor, and/or glass, among other examples.

In some implementations, the second etalon 108 may part of a PD, such as a PD that is configured to be a detector (e.g., a monitor PD) for an optical monitor (e.g., the optical monitor 202 described herein). For example, the PD may include a structure (e.g., a semiconductor structure that comprises multiple semiconductor layers) that has an input surface and a second surface that are parallel to each other and that are separated by a distance. Accordingly, at least some of the structure of the PD may form an etalon (e.g., the second etalon 108), which may have an optical cavity. In this way, the second etalon 108 may be part of the PD.

Figure 1B:
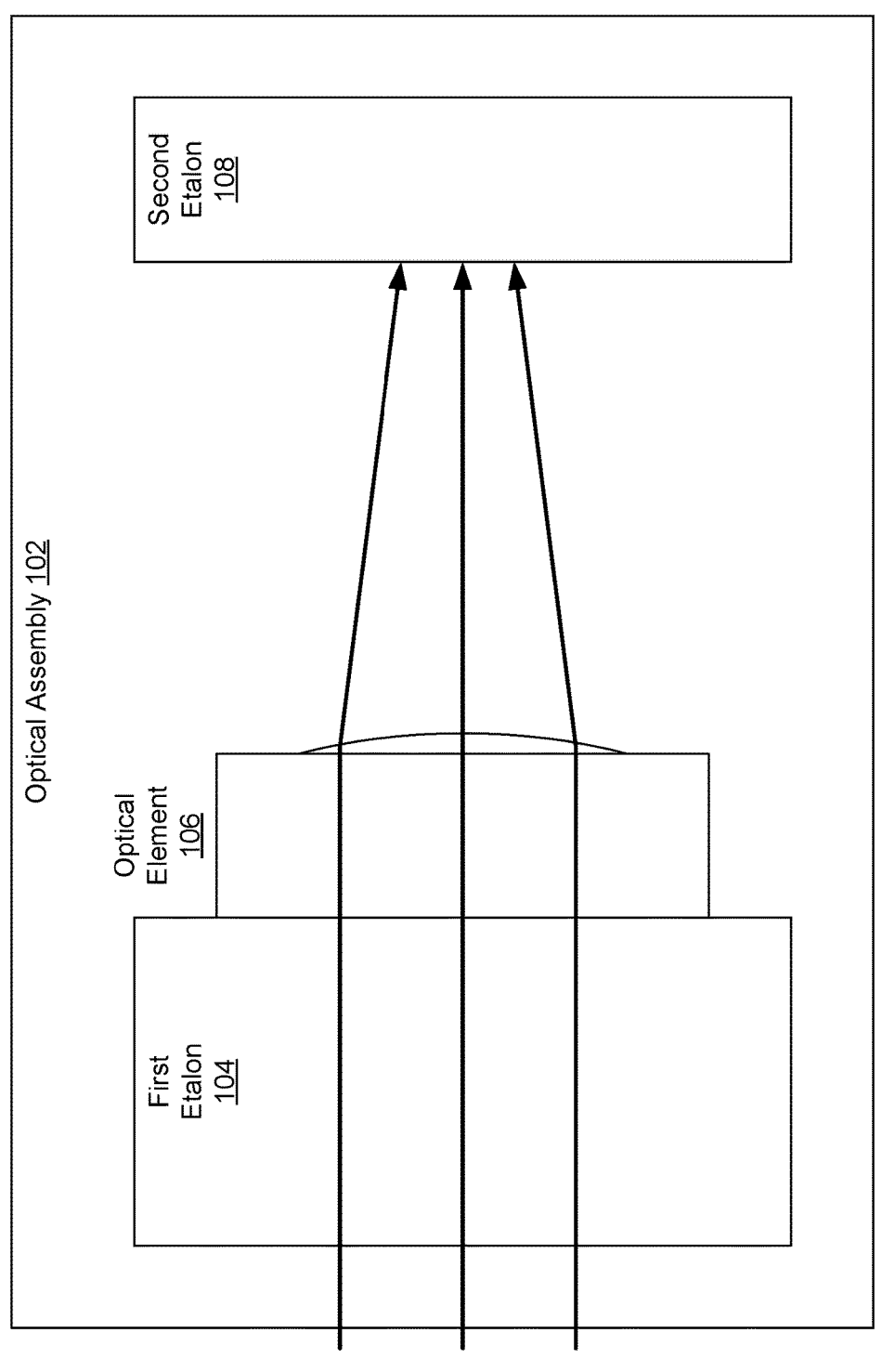
Figure 1C:
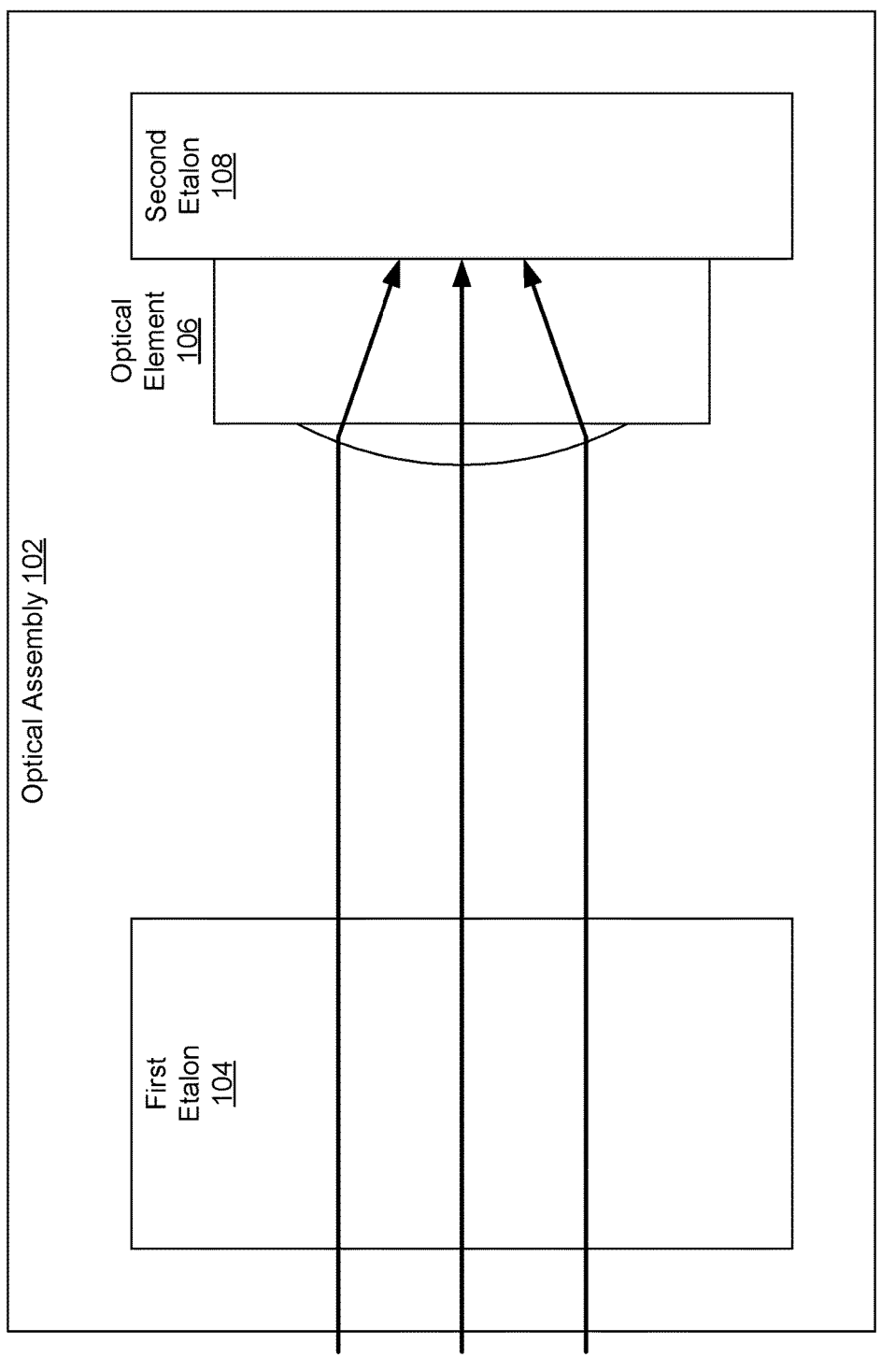
Figure 1D:
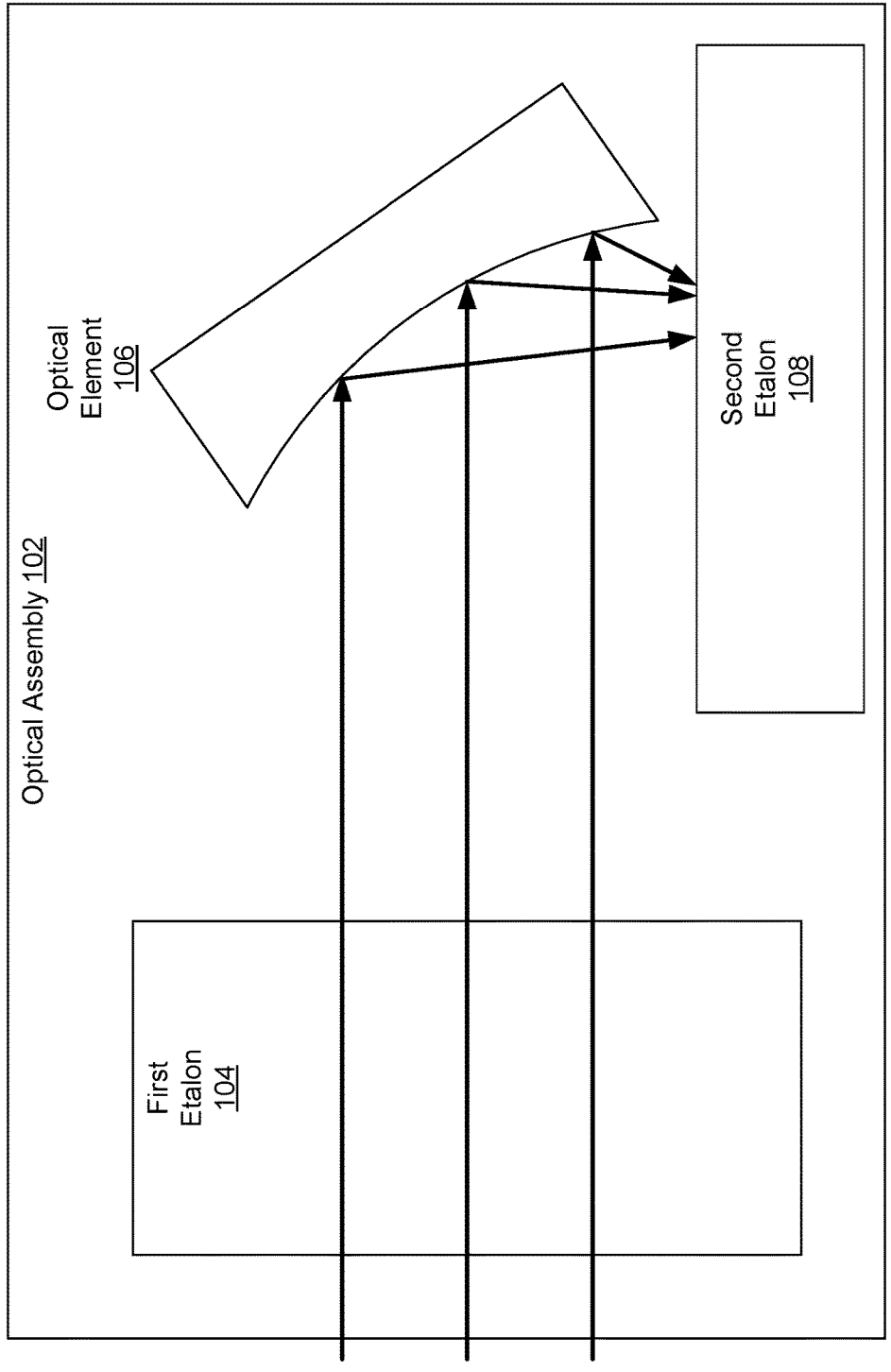

As shown in FIGS. 1A-1C, the optical element 106 may be disposed between the first etalon 104 and the second etalon 108. That is, the optical element 106 may positioned between the first etalon 104 and the second etalon 108 such that the optical element 106 is able to receive a light beam from the first etalon 104 (e.g., from the output surface of the first etalon 104) and to transmit the light beam to the second etalon 108 (e.g., to the input surface of the second etalon 108). Accordingly, the first etalon 104, the optical element 106, and the second etalon 108 may be arranged in a "row" (e.g., as shown in FIGS. 1A-1C), such as when a propagation direction of the light beam (from the first etalon 104 to the second etalon 108) is approximately parallel (e.g., within a tolerance, which may be less than or equal to 1 degree, 2 degrees, 3 degrees, 5 degrees, or 10 degrees) to a particular axis of the optical assembly 102 (e.g., a horizontal axis of the optical assembly as shown in FIGS. 1A-1C). Alternatively, the first etalon 104, the optical element 106, and the second etalon 108 may be arranged in a different configuration, such as a "staggered" or "offset" configuration, such as when the propagation direction of the light beam (from the first etalon 104 to the second etalon 108) is not approximately parallel to the particular axis of the optical assembly 102. For example, as shown in FIG. 1D, the optical element 106 may include a reflective optical component, which therefore causes the propagation direction of the light beam to be "folded" to allow the light beam to propagate to the second etalon 108 (e.g., when the first etalon 104 and the second etalon 108 are not aligned with the particular axis of the optical assembly 102).

In some implementations, the optical element 106 may be separated from at least one of the first etalon 104 or the second etalon 108. For example, as shown in FIG. 1A, the optical element 106 may be separated from the first etalon 104 (e.g., from the output surface of the first etalon 104) by a first gap (e.g., a free space gap or a gap filled with a light transmissive medium, such as epoxy) and/or may be separated from the second etalon 108 (e.g., from the input surface of the second etalon 108) by a second gap (e.g., a free space gap or a gap filled with a light transmissive medium, such as epoxy). In a particular example, such as when the optical element 106 includes a lens (e.g., a converging lens) with a focal length, the optical element 106 may be separated from the second etalon 108 (e.g., from the input surface of the second etalon 108) by a distance that is greater than or less than (but not equal to) the focal length of the lens. This may facilitate the optical element 106 distributing an optical phase of a collimated light beam on the second etalon 108 (e.g., on the input surface of the second etalon 108), as further described herein.

In some implementations, the optical element 106 may be disposed on the first etalon 104. For example, as shown in FIG. 1B, the optical element 106 may be disposed on the output surface of the first etalon 104. In some implementations, the optical element 106 may be disposed on the second etalon 108. For example, as shown in FIG. 1C, the optical element 106 may be disposed on the input surface of the second etalon 108. In some implementations, the optical element 106 and at least one of the first etalon 104 or the second etalon 108 may be integrated to form a monolithic component. For example, the optical element 106 and the first etalon 104 may be integrated to form a monolithic component; the optical element 106 and the second etalon 108 may be integrated to form a monolithic component; or the optical element 106, the first etalon 104, and the second etalon 108 may be integrated to form a monolithic component.

In some implementations, the optical assembly 102 may receive a collimated light beam. For example, as shown in FIGS. 1A-1D, and by the bolded arrows, the collimated light beam may propagate into the optical assembly 102, and then may propagate to the input surface of the first etalon 104. The first etalon 104 may receive the collimated light beam (e.g., the input surface of the first etalon 104 may receive the collimated light beam) and may transmit the collimated light beam from the input surface of the first etalon 104 to the output surface of the first etalon 104 (e.g., may allow the collimated light beam to propagate within the first etalon 104 from the input surface of the first etalon 104 to the output surface of the first etalon 104). The first etalon 104 then may provide the collimated light beam to the optical element 106 (e.g., may allow the collimated light beam to propagate from the output surface of the first etalon 104 to the optical element 106).

The optical element 106 may be configured to receive the collimated light beam and may change the collimated light beam. For example, the optical element 106 may de-collimate the collimated light beam to create a de-collimated light beam. The optical element 106 then may provide the de-collimated light beam to the second etalon 108 (e.g., allow the de-collimated light beam to propagate from the optical element 106 to the input surface of the second etalon 108).

The second etalon 108 may receive the de-collimated light beam (e.g., the input surface of the second etalon 108 may receive the de-collimated light beam) and may transmit the de-collimated light beam from the input surface of the second etalon 108 to the output surface of the second etalon 108 (e.g., may allow the de-collimated light beam to propagate within the second etalon 108 from the input surface of the second etalon 108 to the output surface of the second etalon 108).

Accordingly, because the light beam that propagates through the second etalon 108 is de-collimated (e.g., the optical element 106 distributes an optical phase of the light beam on the second etalon 108), reflections within the second etalon 108 and/or reflections back from the second etalon 108 to the first etalon 104 are minimized or eliminated. This has the effect of eliminating, or minimizing, a resonance response (e.g., a parasitic etalon response) within the second etalon 108 and/or a resonance response from the second etalon 108 to the first etalon 104. The optical element 106 may therefore be configured to reduce etalon responses, including feedback, within the second etalon 108 and/or from the second etalon 108 to the first etalon 104; to reduce resonances between the first etalon 104 and the second etalon 108; or decouple the first etalon 104 from the second etalon 108. Accordingly, in an implementation in which the second etalon 108 is part of a PD (e.g., a monitor PD of an optical frequency monitor), the PD may provide a more accurate optical measurement related to the light beam (e.g., an optical frequency measurement).

As indicated above, FIGS. 1A-1D are provided as examples. Other examples may differ from what is described with regard to FIGS. 1A-1D.

Figure 2:
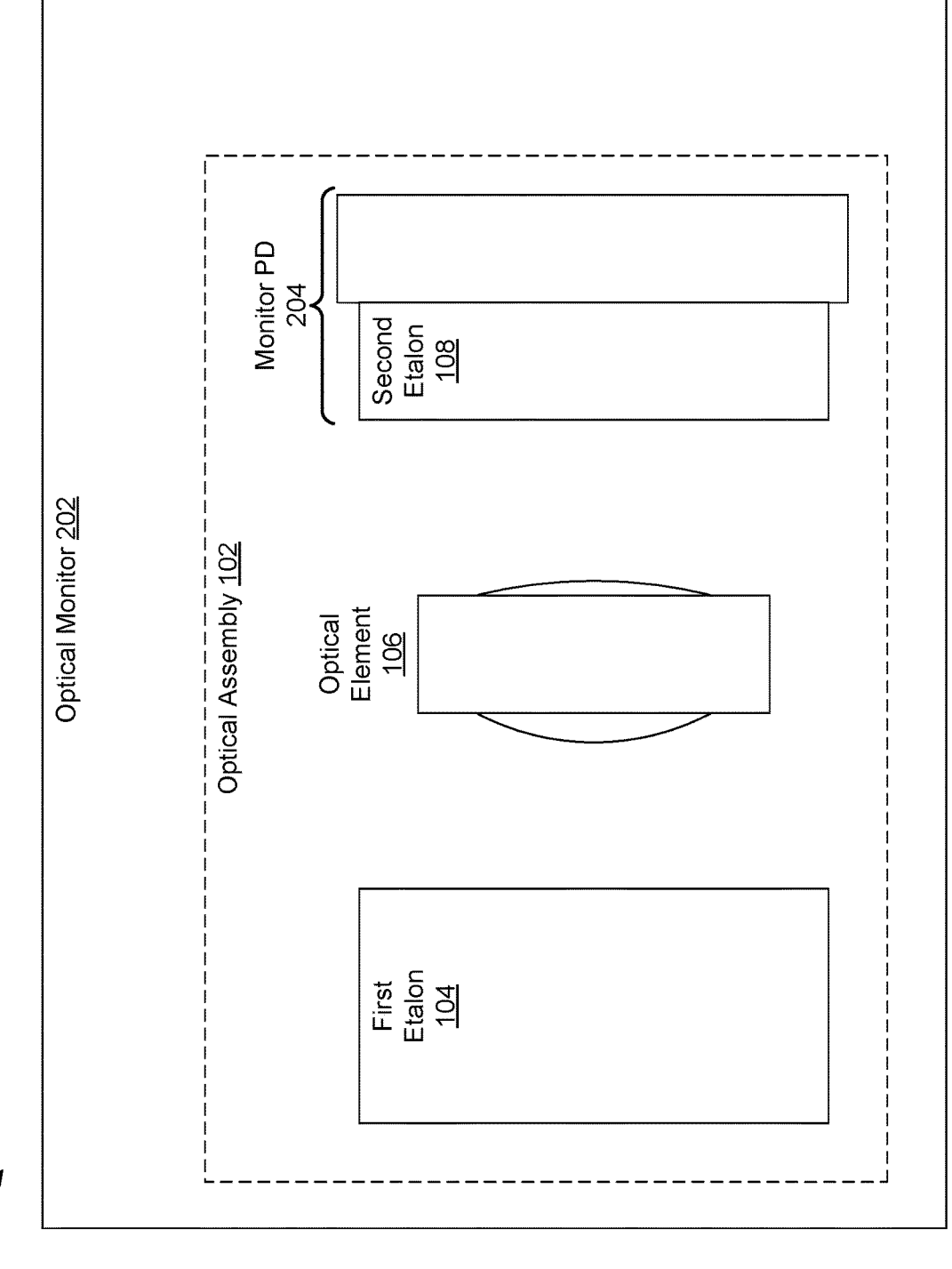
FIG. 2 is a diagram of an example implementation described herein.

FIG. 2 is a diagram of an example implementation 200 described herein. As shown in FIG. 2, example implementation 200 comprises an optical monitor 202, which may include the optical assembly 102. The optical monitor 202 may include a monitor PD 204.

In some implementations, the optical monitor 202 may be an optical frequency monitor, and may be configured to monitor (e.g., measure) a frequency of a light beam. For example, the optical monitor 202 may be configured to monitor a range from 179 THz to 240 THz (e.g., greater than or equal to 179 THz and less than or equal to 240 THz) and/or another range. Alternatively, the optical monitor 202 may be an optical power monitor, and may be configured to monitor (e.g., measure) a power of a light beam.

In some implementations, the optical assembly 102 may be included in the optical monitor 202, and, accordingly, the second etalon 108 may be part of the monitor PD 204, that is included in the optical monitor 202. Accordingly, the second etalon 108 may comprise at least some of a structure of the monitor PD 204, and therefore may be configured to facilitate the monitor PD 204 capturing one or more measurements (e.g., one or more frequency measurements, one or more power measurements, or one or more other measurements) related to the monitor PD 204 monitoring a light beam. The optical assembly 102 may include one or more other components, such as one or more connecting components, one or more processors, or other components that are configured to transmit, process, and/or provide the one or more measurements captured by the monitor PD 204. In this way, the optical monitor 202 may facilitate monitoring of the light beam, such as to facilitate optimal transmission of the light beam.

As indicated above, FIG. 2 is provided as an example. Other examples may differ from what is described with regard to FIG. 2.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," "left," "right," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical assembly, comprising:
an etalon;
an optical cavity between a first reflection surface and a second reflection surface; and
an optical element disposed between the etalon and the optical cavity, wherein:
the etalon is configured to transmit a collimated light beam from an input surface of the etalon to an output surface of the etalon, and to allow the collimated light beam to propagate from the output surface of the etalon to the optical element,
the optical element is configured to receive the collimated light beam, to change the collimated light beam to a de-collimated light beam, and to allow the de-collimated light beam to propagate from the optical element to the first reflection surface,
the optical element includes a lens,
the optical element is positioned to reduce reflections within the optical cavity,
the optical element is positioned to reduce reflections between the optical cavity and the etalon, and
the optical cavity is configured to allow the de-collimated light beam to propagate from the first reflection surface to the second reflection surface.

2. The optical assembly of claim 1, wherein the optical element is disposed on at least one of:
the output surface of the etalon, or
the first reflection surface.

3. The optical assembly of claim 1, wherein the optical element is at least one of:
separated from the output surface of the etalon by a first gap, or
separated from the first reflection surface by a second gap.

4. The optical assembly of claim 1, wherein the optical element further includes at least one of:
a reflective optical component,
a refractive optical component, or
a diffractive optical component.

5. The optical assembly of claim 1,
wherein a distance between the optical element and the first reflection surface is greater than or less than a focal length of the lens.

6. The optical assembly of claim 1,
wherein the optical cavity is part of a photodiode.

7. The optical assembly of claim 1,
wherein the optical assembly is to be included in an optical frequency monitor and the optical cavity is part of a monitor photodiode that is to be included in the optical frequency monitor.

8. The optical assembly of claim 7,
wherein the optical frequency monitor is configured to monitor a range from 179 terahertz (THz) to 240 THz.

9. An optical assembly, comprising:
an etalon;
an optical cavity between a first reflection surface and a second reflection surface; and
an optical element disposed between the etalon and the optical cavity, wherein:
the etalon is configured to allow a collimated light beam to propagate from an output surface of the etalon to the optical element,
the optical element is configured to receive the collimated light beam, to change the collimated light beam to a de-collimated light beam, and to allow the de-collimated light beam to propagate from the optical element to the first reflection surface,
the optical element includes a lens,
the optical element is positioned to reduce reflections within the optical cavity, and
the optical element is positioned to reduce reflections between the optical cavity and the etalon.

10. The optical assembly of claim 9,
wherein the optical element is disposed on at least one of:
the output surface of the etalon, or
the first reflection surface.

11. The optical assembly of claim 9,
wherein the optical element and at least one of the etalon or the optical cavity are integrated to form a monolithic component.

12. The optical assembly of claim 9,
wherein the optical element is further configured to at least one of:
reduce etalon responses, including feedback, from the optical cavity to the etalon, reduce resonances between the etalon and the optical cavity, or
decouple the etalon from the optical cavity.

13. The optical assembly of claim 9,
wherein the optical element further includes at least one of:
a reflective optical component,
a refractive optical component, or
a diffractive optical component.

14. The optical assembly of claim 9,
wherein a distance between the optical element and the first reflection surface is greater than or less than a focal length of the lens.

15. The optical assembly of claim 9,
wherein the optical element further includes a diffractive grating.

16. The optical assembly of claim 9,
wherein the optical assembly is to be included in an optical frequency monitor and the optical cavity is part of a monitor photodiode.

17. An optical assembly, comprising:
an etalon;
a monitor photodiode; and
an optical element, wherein:
the etalon is configured to provide a collimated light beam to the optical element,
the optical element is configured to change the collimated light beam to a de-collimated light beam, and to provide the de-collimated light beam to the monitor photodiode,
the optical element includes a lens,
the optical element is positioned to reduce reflections within the monitor photodiode, and
the optical element is positioned to reduce reflections between the monitor photodiode and the etalon.

18. The optical assembly of claim 17,
wherein at least some of a structure of the monitor photodiode forms an optical cavity between a first reflection surface and a second reflection surface.

19. The optical assembly of claim 17,
wherein the optical assembly is to be included in an optical frequency monitor.

20. The optical assembly of claim 17,
wherein the optical element is disposed on at least one of:
the etalon, or
the monitor photodiode.

* * * * *